(12) United States Patent
Wu

(10) Patent No.: US 6,617,710 B2
(45) Date of Patent: Sep. 9, 2003

(54) CONTROL CIRCUIT FOR USE WITH SWITCH POWER CONVERTER

(75) Inventor: Chin-Li Wu, Taipei (TW)

(73) Assignee: Primax Electronics Ltd. (CN)

( * ) Notice: Subject to any disclaimer, the term of this patent is extended or adjusted under 35 U.S.C. 154(b) by 0 days.

(21) Appl. No.: 10/160,343

(22) Filed: May 31, 2002

(65) Prior Publication Data
US 2002/0186575 A1 Dec. 12, 2002

(30) Foreign Application Priority Data
Jun. 8, 2001 (TW) .................................. 90114002 A

(51) Int. Cl.$^7$ .............................................. H01H 47/00
(52) U.S. Cl. ...................................................... 307/125
(58) Field of Search .......................... 363/15, 13, 178; 307/149, 112, 116, 125–126, 130, 131

(56) References Cited
U.S. PATENT DOCUMENTS 3,573,483 A * 4/1971 White ........................ 307/66
6,504,270 B1 * 1/2003 Matsushita ................. 307/140

* cited by examiner

Primary Examiner—Shawn Riley
(74) Attorney, Agent, or Firm—Webb Ziesenheim Logsdon Orkin & Hanson, P. C.

(57) ABSTRACT

A control circuit for use with a switch power converter is disclosed. The control circuit includes a capacitor device electrically connected between a variable resistor of the feedback circuit and ground in series, a first divider resistor electrically connected between the variable resistor and the controlled switch circuit in series, a second divider resistor electrically connected between the first divider resistor and ground in series, and a controlled switch electrically connected among the controlled switch circuit, the first divider resistor and ground. The variable resistor has a resistance varying with a voltage value of the load. Furthermore, when an overall voltage value of the first and second divider resistors varies with the resistance of the variable resistor to switch the controlled switch for further optionally enabling the controlled switch circuit to allow the transformer with the peripheral circuit to process the energy transformation.

15 Claims, 3 Drawing Sheets

CONTROL CIRCUIT FOR USE WITH SWITCH POWER CONVERTER

FIELD OF THE INVENTION

The present invention relates to a control circuit, and more particularly to a control circuit for use with a switch power converter.

BACKGROUND OF THE INVENTION

FIG. 1 is a diagram illustrating circuit functional blocks of a conventional switch power converter. As shown in FIG. 1, the switch power converter 1 includes a bridge rectifying circuit 11, a filter circuit 12 for avoiding the electromagnetic wave interference, a transformer with its peripheral circuit 13, a DC output circuit 14, a controlled switch circuit 15, a feedback circuit 16 and a control circuit 17. The AC power 10 is transformed to a DC voltage via the switch power converter 1, and then the DC voltage is provided to a load 18. The feedback circuit transfers the variation state of the current density or the voltage value at the output end to the control circuit 17. Hence, the control circuit 17 will generate a control signal which is outputted to the controlled switch circuit 15 in response to the state of the current density or the voltage value for determining the working condition of the transformer and its peripheral circuit 13. Therefore, the switch power converter 1 can provide a proper DC power for the load 18.

For the conventional switch power converter, a pulse bandwidth modulating IC is used to achieve the function of the control circuit. As known, the pulse bandwidth modulating IC will still keep producing a modulating signal of a very small pulse bandwidth even when the conventional switch power converter is free from load to consume power. Hence, the power will keep losing. In addition to the power loss, the control circuit using the pulse bandwidth modulating IC also has the disadvantages of high cost and large volume.

Therefore, the purpose of the present invention is to develop a control circuit for use with a switch power converter to deal with the above situations encountered in the prior art.

SUMMARY OF THE INVENTION

An object of the present invention is to provide a control circuit for use with a power switch converter for avoiding the power loss when the power switch converter is operated without loading.

Another object of the present invention is to provide a control circuit for use with a power switch converter for reducing the size of the power switch converter.

A further object of the present invention is to provide a control circuit for use with a power switch converter for reducing the cost.

According to an aspect of the present invention, there is provided a control circuit for use with a switch power converter. The switch power converter includes a rectifying circuit, a transformer with a peripheral circuit, a DC output circuit, a controlled switch circuit and a feedback circuit for transforming an AC power to a DC voltage provided to a load. The control circuit includes a capacitor device electrically connected between a variable resistor of the feedback circuit and ground in series, the variable resistor has a resistance varying with a voltage value of the load, a first divider resistor electrically connected between the variable resistor and the controlled switch circuit in series, a second divider resistor electrically connected between the first divider resistor and ground in series, and a controlled switch electrically connected among the controlled switch circuit, the first divider resistor and ground, wherein an overall voltage value of the first and second divider resistors varies with the resistance of the variable resistor to switch the controlled switch for further optionally enabling the controlled switch circuit to allow the transformer with the peripheral circuit to process an energy transformation.

Preferably, the variable resistor electrically connected to the capacitor device in series is a transistor portion of a photo-coupler.

For example, the controlled switch can be a transistor. The controlled switch is preferably a bipolar junction transistor.

Preferably, the controlled switch is electrically connected to a switch of the controlled switch circuit. For example, the switch can be a metal oxide semiconductor field effect transistor (MOSFET).

Preferably, when the overall voltage value of the first and second divider resistors increases with the decrease of the voltage value of the load, the overall voltage value of the first and second divider resistors decreases to result in turning the controlled switch off and further enabling the controlled switch circuit to allow the transformer with the peripheral circuit to process the energy transformation, and when the overall voltage value of the first and second divider resistors decreases with the increase of the voltage value of the load, the overall voltage value of the first and second divider resistors increases to result in turning the controlled switch on and further disabling the controlled switch circuit to stop the transformer with the peripheral circuit processing the energy transformation.

According to another aspect of the present invention, there is provided a control circuit for use with a switch power converter. The switch power converter includes a rectifying circuit, a transformer with a peripheral circuit, a DC output circuit, a controlled switch circuit and a feedback circuit for transforming an AC power to a DC voltage provided to a load. The control circuit includes a capacitor device electrically connected between a variable resistor of the feedback circuit and ground in series, the variable resistor has a resistance varying with a voltage value of the load, a divider resistor electrically connected between the variable resistor and the controlled switch circuit in series, and a controlled switch electrically connected among the controlled switch circuit, the divider resistor and ground, wherein a voltage value of the divider resistor varies with the resistance of the variable resistor to switch the controlled switch for further optionally enabling the controlled switch circuit to allow the transformer with the peripheral circuit to process an energy transformation.

Preferably, the variable resistor electrically connected to the capacitor device in series is a transistor portion of a photo-coupler.

For example, the controlled switch can be a transistor. The controlled switch is preferably a bipolar junction transistor.

Preferably, the controlled switch is electrically connected to a switch of the controlled switch circuit. For example, the switch can be a metal oxide semiconductor field effect transistor (MOSFET).

Preferably, wherein when the voltage value of the divider resistors increase with the decrease of the voltage value of the load, the voltage value of the divider resistor decreases to result in turning the controlled switch off and further enabling the controlled switch circuit to allow the transformer with the peripheral circuit to process the energy transformation, and when the voltage value of the divider resistor decreases with the increase of the voltage value of the load, the voltage value of the divider resistor increases to result in turning the controlled switch on and further disabling the controlled switch circuit to stop the transformer with the peripheral circuit processing the energy transformation.

According to an additional aspect of the present invention, there is provided a control circuit for use with a switch power converter. The switch power converter includes a rectifying circuit, a transformer with a peripheral circuit, a DC output circuit, a controlled switch circuit and a feedback circuit for transforming an AC power to a DC voltage provided to a load. The control circuit includes a capacitor device electrically connected between a variable resistor of the feedback circuit and ground in series, the variable resistor has a resistance varying with a voltage value of the load, a first divider resistor electrically connected between the variable resistor and the controlled switch circuit in series, a second divider resistor electrically connected between the first divider resistor and ground in series, and a controlled switch electrically connected among the controlled switch circuit, the first divider resistor and ground. When an overall voltage value of the first and second divider resistors increases with the decrease of the voltage value of the load, the overall voltage value of the first and second divider resistors decreases to result in turning the controlled switch off and further enabling the controlled switch circuit to allow the transformer with the peripheral circuit to process the energy transformation. When the overall voltage value of the first and second divider resistors decreases with the increase of the voltage value of the load, the overall voltage value of the first and second divider resistors increases to result in turning the controlled switch on and further disabling the controlled switch circuit to stop the transformer with the peripheral circuit processing the energy transformation.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
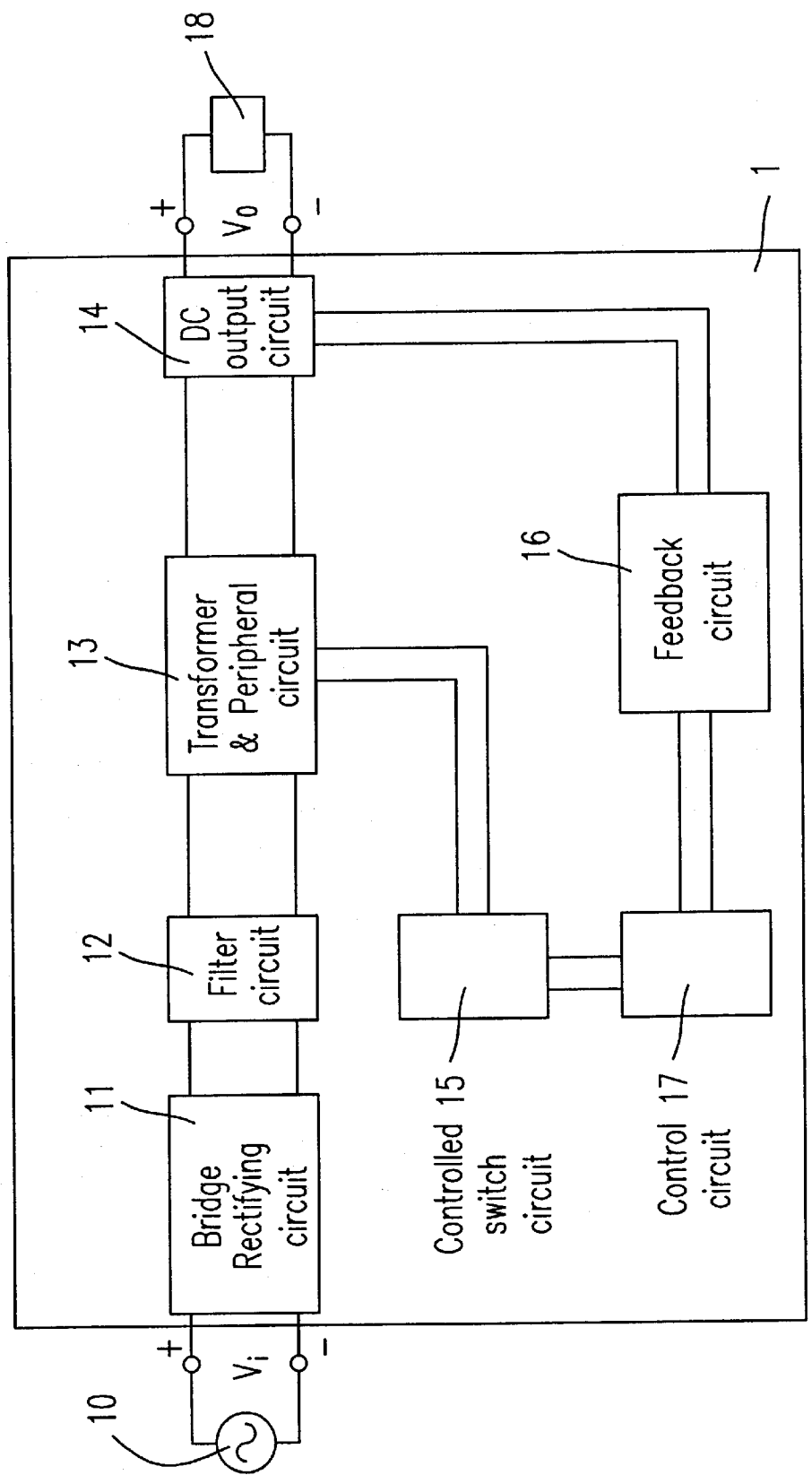
FIG. 1 is a functional block diagram showing a conventional switch power converter.
Figure 2:
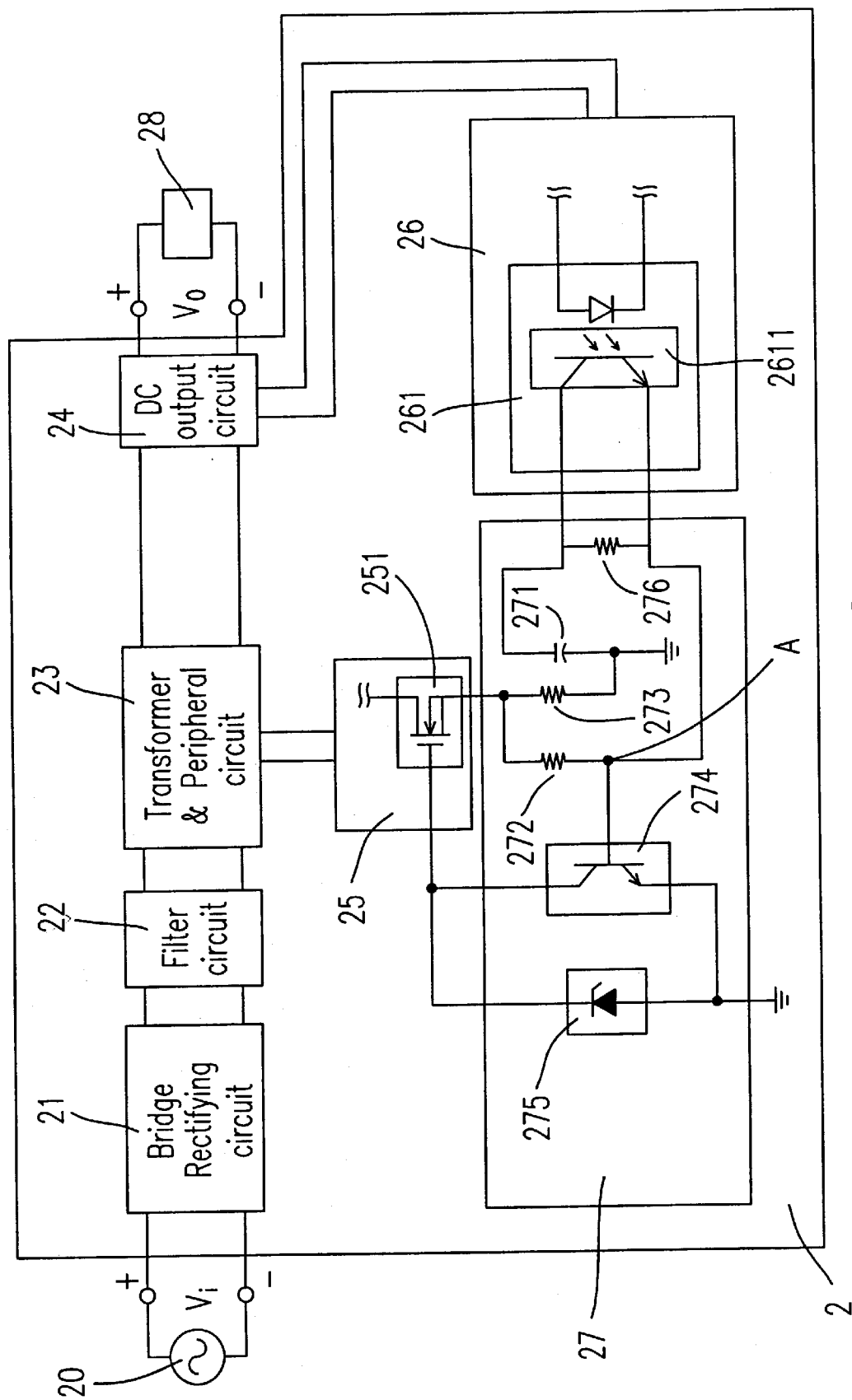
FIG. 2 is a circuit block diagram illustrating a preferred embodiment of a switch power converter according to the present invention.

Please refer to FIG. 2 which is a block diagram showing a preferred embodiment of a switch power converter according to the present invention. A bridge rectifying circuit 21, a filter circuit 22 for avoiding the electromagnetic wave interference, a transformer with its peripheral circuit 23, a DC output circuit 24, a controlled switch circuit 25 and a feedback circuit 26 of the present invention are similar to those of the prior art except a control circuit 27 of the present invention. In stead of using the pulse bandwidth modulating IC, the switch power converter 2 of the present invention utilizes the control circuit 27 to efficiently transform an AC power 20 into a DC voltage provided for a load 28.

As shown in FIG. 2, the control circuit includes a capacitor device 271, a first divider resistor 272, a second divider resistor 273 and a controlled switch 274 which is a bipolar junction transistor. The capacitor device 271 is electrically connected between a transistor portion 2611 of a photo-coupler 261 in the feedback circuit 26 and ground in series. The transistor portion 2611 of the photo-coupler 261 serves as a variable resistor in the circuitry. Furthermore, in response to the decreasing of the voltage value of the load 28, the resistance of the variable resistor will increase, and in response to the increasing of the voltage value of the load 28, the resistance of the variable resistor will decrease. Moreover, the first divider resistor 272 is electrically connected between the transistor portion 2611 of the photo-coupler 261 and a metal oxide semiconductor field effect transistor (MOSFET) 251 of the controlled switch circuit 25 in series. The MOSFET 251 is used as a switch in the controlled switch circuit 25. The second divider resistor 273 is electrically connected between the first divider resistor 272 and ground in series. In addition, a bipolar junction transistor used as a controlled switch 274 is electrically connected among the MOSFET 251, the first divider resistor 272 and ground.

The voltage provided by the capacitor device 271 is divided via the transistor portion 2611 of the photo-coupler 261, the first divider resistor 272 and the second divider resistor 273. When the resistance of the transistor portion 2611 of the photo-coupler 261 increases with the decrease of the voltage value of the load 28, the overall voltage value of the first and second divider resistors 272 and 273, i.e. the voltage value at node A, will decrease. The voltage decreasing at node A will result in turning the controlled switch 274 off, and further enabling the MOSFET 251 of the controlled switch circuit 25 to employ the transformer with its peripheral circuit 23 to process the energy transformation. On the other hand, when the resistance of the transistor portion 2611 of the photo-coupler 261 decreases in response to the voltage value increasing of the load 28, the voltage value at node A will increase and result in turning the controlled switch 274 on. Further, the MOSFET 251 of the controlled switch circuit 25 is disabled to stop the transformer with its peripheral circuit 23 processing the energy transformation.

In addition, a zener diode 275 and a limiter resistor 276 in FIG. 2 are used to protect the control circuit 27 and do not cause significantly effect on the above action.

Figure 3:
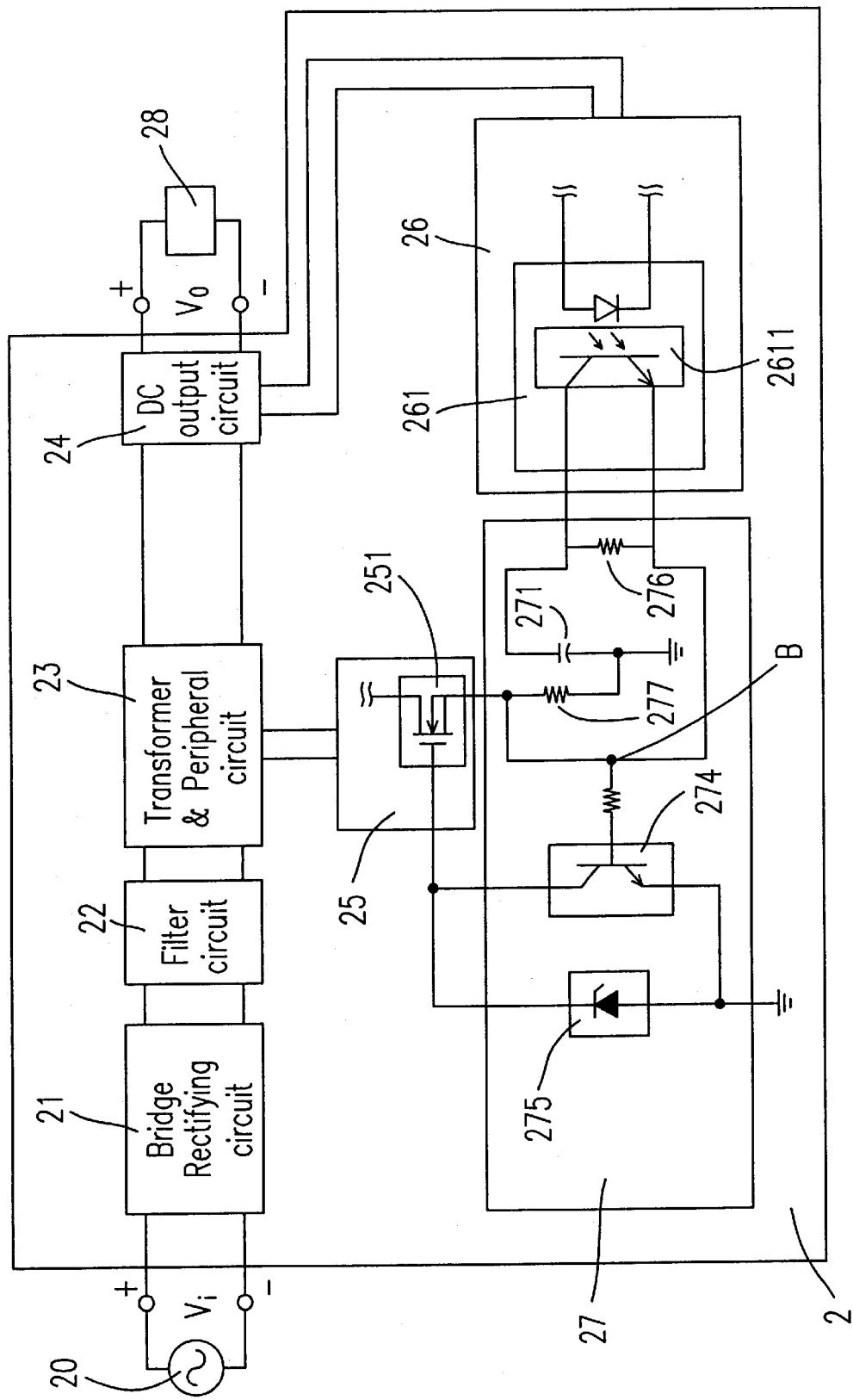
FIG. 3 is a circuit block diagram illustrating another preferred embodiment of a switch power converter according to the present invention.

Please refer to FIG. 3 which is a block diagram showing another preferred embodiment of a switch power converter according to the present invention. As shown in FIG. 3, the controlled switch circuit 25, the feedback circuit 26, and the control circuit 27 are similar to those illustrated in the aforementioned embodiment except that only one divider resistor 277 is electrically connected between the transistor portion 2611 of the photo-coupler 261 and ground.

The voltage of the capacitor device 271 is divided by the transistor portion 2611 of the photo-coupler 261 and the divider resistor 277. In response to the decreasing of the voltage value of the load 28, the resistance of the transistor portion 2611 of the photo-coupler 261 will increase, thereby resulting in that the voltage value of the divider resistors 277, i.e. the voltage value at node B, will decrease. When the voltage at node B decreases, the controlled switch 274 is turned off to further enable the MOSFET 251 of the controlled switch circuit 25 to allow the transformer with its peripheral circuit 23 to process the energy transformation. On the other hand, when the resistance of the transistor portion 2611 of the photo-coupler 261 decreases in response to the voltage value increasing of the load 28, the voltage value at node B will increase and result in turning the controlled switch 274 on. Then, the MOSFET 251 of the controlled switch circuit 25 is disabled to stop the transformer with its peripheral circuit 23 processing the energy transformation. However, for loading possibly too much current, the controlled switch 274 preferably employs the transistor which can load large current, such as a bipolar junction transistor.

To sum up, the control circuit according to the present invention has the advantages of simple structure, low cost and small volume compared to the pulse bandwidth modulating IC. In addition, the control circuit of the present invention can provide proper DC current in response to the load change. Furthermore, the control circuit will not output power when the load is zero, so the present invention can efficiently solve the power loss problem of the pulse bandwidth modulating IC which will keep outputting power for even no loading. Moreover, owing to the small volume of the control circuit, the product will be easily carried with. Therefor, the present invention can indeed solve the problems of the prior art.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control circuit for use with a switch power converter, said switch power converter including a rectifying circuit, a transformer with a peripheral circuit, a DC output circuit, a controlled switch circuit and a feedback circuit for transforming an AC power to a DC voltage provided to a load, said control circuit comprising:
    a capacitor device electrically connected between a variable resistor of said feedback circuit and ground in series, said variable resistor has a resistance varying with a voltage value of said load;
    a first divider resistor electrically connected between said variable resistor and said controlled switch circuit in series;
    a second divider resistor electrically connected between said first divider resistor and ground in series; and
    a controlled switch electrically connected among said controlled switch circuit, said first divider resistor and ground,
    wherein an overall voltage value of said first and second divider resistors varies with said resistance of said variable resistor to switch said controlled switch for further optionally enabling said controlled switch circuit to allow said transformer with said peripheral circuit to process an energy transformation.

2. The control circuit according to claim 1 wherein said variable resistor electrically connected to said capacitor device in series is a transistor portion of a photo-coupler.

3. The control circuit according to claim 1 wherein said controlled switch is a transistor.

4. The control circuit according to claim 3 wherein said controlled switch is a bipolar junction transistor.

5. The control circuit according to claim 1 wherein said controlled switch is electrically connected to a switch of said controlled switch circuit.

6. The control circuit according to claim 5 wherein said switch is a metal oxide semiconductor field effect transistor (MOSFET).

7. The control circuit according to claim 1 wherein when said overall voltage value of said first and second divider resistors increases with the decrease of said voltage value of said load, said overall voltage value of said first and second divider resistors decreases to result in turning said controlled switch off and further enabling said controlled switch circuit to allow said transformer with said peripheral circuit to process said energy transformation, and when said overall voltage value of said first and second divider resistors decreases with the increase of said voltage value of said load, said overall voltage value of said first and second divider resistors increases to result in turning said controlled switch on and further disabling said controlled switch circuit to stop said transformer with said peripheral circuit processing said energy transformation.

8. A control circuit for use with a switch power converter, said switch power converter including a rectifying circuit, a transformer with a peripheral circuit, a DC output circuit, a controlled switch circuit and a feedback circuit for transforming an AC power to a DC voltage provided to a load, said control circuit comprising:
    a capacitor device electrically connected between a variable resistor of said feedback circuit and ground in series, said variable resistor has a resistance varying with a voltage value of said load;
    a divider resistor electrically connected between said variable resistor and said controlled switch circuit in series; and
    a controlled switch electrically connected among said controlled switch circuit, said divider resistor and ground,
    wherein a voltage value of said divider resistor varies with said resistance of said variable resistor to switch said controlled switch for further optionally enabling said controlled switch circuit to allow said transformer with said peripheral circuit to process an energy transformation.

9. The control circuit according to claim 8 wherein said variable resistor electrically connected to said capacitor device in series is a transistor portion of a photo coupler.

10. The control circuit according to claim 8 wherein said controlled switch is a transistor.

11. The control circuit according to claim 10 wherein said controlled switch is a bipolar junction transistor.

12. The control circuit according to claim 8 wherein said controlled switch is electrically connected to a switch of said controlled switch circuit.

13. The control circuit according to claim 12 wherein said switch is a metal oxide semiconductor field effect transistor (MOSFET).

14. The control circuit according to claim 8 wherein when said voltage value of said divider resistors increase with the decrease of said voltage value of said load, said voltage value of said divider resistor decreases to result in turning said controlled switch off and further enabling said controlled switch circuit to allow said transformer with said peripheral circuit to process said energy transformation, and when said voltage value of said divider resistor decreases with the increase of said voltage value of said load, said voltage value of said divider resistor increases to result in turning said controlled switch on and further disabling said controlled switch circuit to stop said transformer with said peripheral circuit processing said energy transformation.

15. A control circuit for use with a switch power converter, said switch power converter including a rectifying circuit, a transformer with a peripheral circuit, a DC output circuit, a controlled switch circuit and a feedback circuit for transforming an AC power to a DC voltage provided to a load, said control circuit comprising:

a capacitor device electrically connected between a variable resistor of said feedback circuit and ground in series, said variable resistor has a resistance varying with a voltage value of said load;

a first divider resistor electrically connected between said variable resistor and said controlled switch circuit in series;

a second divider resistor electrically connected between said first divider resistor and ground in series; and a controlled switch electrically connected among said controlled switch circuit, said first divider resistor and ground, wherein when an overall voltage value of said first and second divider resistors increases with the decrease of said voltage value of said load, said overall voltage value of said first and second divider resistors decreases to result in turning said controlled switch off and further enabling said controlled switch circuit to allow said transformer with said peripheral circuit to process said energy transformation, and when said overall voltage value of said first and second divider resistors decreases with the increase of said voltage value of said load, said overall voltage value of said first and second divider resistors increases to result in turning said controlled switch on and further disabling said controlled switch circuit to stop said transformer with said peripheral circuit processing said energy transformation.

* * * * *